US011359625B2

United States Patent
Kurihara et al.

(10) Patent No.: US 11,359,625 B2
(45) Date of Patent: Jun. 14, 2022

(54) CAPACITY CONTROL VALVE HAVING AN AUXILIARY COMMUNICATION PART ALLOWING COMMUNICATION WITH AN INTERMEDIATE PASSAGE

(71) Applicant: EAGLE INDUSTRY CO., LTD., Tokyo (JP)

(72) Inventors: Daichi Kurihara, Tokyo (JP); Kohei Fukudome, Tokyo (JP); Keigo Shirafuji, Tokyo (JP)

(73) Assignee: EAGLE INDUSTRY CO., LTD.

( * ) Notice: Subject to any disclaimer, the term of this patent is extended or adjusted under 35 U.S.C. 154(b) by 73 days.

(21) Appl. No.: 16/624,251

(22) PCT Filed: Jul. 3, 2018

(86) PCT No.: PCT/JP2018/025123
§ 371 (c)(1),
(2) Date: Dec. 18, 2019

(87) PCT Pub. No.: WO2019/009266
PCT Pub. Date: Jan. 10, 2019

(65) Prior Publication Data
US 2021/0048017 A1    Feb. 18, 2021

(30) Foreign Application Priority Data
Jul. 6, 2017    (JP) .............................. JP2017-133157

(51) Int. Cl.
*F04B 49/12*    (2006.01)
*F04B 27/18*    (2006.01)
(Continued)

(52) U.S. Cl.
CPC .......... *F04B 49/12* (2013.01); *F04B 27/1804* (2013.01); *F04B 49/02* (2013.01);
(Continued)

(58) Field of Classification Search
CPC ...... F04B 2027/1809; F04B 2027/1818; F04B 2027/1822; F04B 2027/1836
See application file for complete search history.

(56) References Cited

U.S. PATENT DOCUMENTS

| 6,234,763 B1 * | 5/2001 | Ota ..................... F04B 27/1804 251/61.5 |
| 6,939,112 B2 | 9/2005 | Taguchi .............. F04B 27/1804 |

(Continued)

FOREIGN PATENT DOCUMENTS

| JP | 2003322086 A | 11/2003 | |
| JP | 2004353451 | 12/2004 | .............. F04B 27/14 |

(Continued)

OTHER PUBLICATIONS

International Search Report (ISR) dated Sep. 18, 2018, issued for International application No. PCT/JP2018/025123. (1 page).

(Continued)

*Primary Examiner* — Nathan C Zollinger
*Assistant Examiner* — Timothy P Solak
(74) *Attorney, Agent, or Firm* — Hayes Soloway P.C.

(57) ABSTRACT

A capacity control valve (1) for controlling a flow rate or pressure of a variable capacity compressor according to a valve opening degree of a valve section includes: a valve main body (10) having a first valve chamber (14), a second valve chamber (15) and an interior space (16); a valve body (21) having an intermediate communication passage (26) for allowing communication between the first valve chamber and the interior space, a first valve part (21c1) arranged in the first valve chamber, a second valve part (21b1) for opening and closing communication between the interior space and the second valve chamber, and a shaft part (21a) arranged in the interior space; a solenoid (30); a pressure-sensitive body (22) arranged in the interior space; and an auxiliary communication part (21f) which is arranged in the (Continued)

interior space and which allows communication between the interior space and the intermediate communication passage.

18 Claims, 9 Drawing Sheets

(51) Int. Cl.
*F04B 49/02* (2006.01)
*F16K 31/06* (2006.01)
*F16K 31/126* (2006.01)

(52) U.S. Cl.
CPC .......... *F16K 31/06* (2013.01); *F16K 31/0627* (2013.01); *F16K 31/126* (2013.01); *F04B 2027/1809* (2013.01); *F04B 2027/1818* (2013.01); *F04B 2027/1822* (2013.01); *F04B 2027/1831* (2013.01); *F04B 2027/1836* (2013.01); *F04B 2027/1845* (2013.01); *F04B 2027/1872* (2013.01); *F16K 31/0613* (2013.01)

(56) References Cited

U.S. PATENT DOCUMENTS

| | | | |
|---|---|---|---|
| 8,931,517 B2 | 1/2015 | Okamoto | ............ F16K 31/0624 |
| 2006/0280616 A1* | 12/2006 | Umemura | ........... F04B 27/1804 |
| | | | 417/222.2 |
| 2008/0247883 A1 | 10/2008 | Yokomachi | ......... F04B 27/1804 |
| 2009/0183786 A1* | 7/2009 | Iwa | ..................... F04B 27/1804 |
| | | | 137/487.5 |
| 2012/0198992 A1* | 8/2012 | Futakuchi | ........... F04B 27/1804 |
| | | | 91/505 |
| 2015/0211502 A1 | 7/2015 | Ota | ........................ F04B 1/295 |

FOREIGN PATENT DOCUMENTS

| | | | |
|---|---|---|---|
| JP | 2005307817 | 11/2005 | .............. F04B 27/14 |
| JP | 5167121 B2 | 3/2013 | |
| WO | 2007119380 A1 | 10/2007 | |

OTHER PUBLICATIONS

U.S. Appl. No. 16/622,200, filed Dec. 12, 2019, Kurihara et al.
U.S. Appl. No. 16/624,251, filed Dec. 18, 2019, Kurihara et al.
Search Report, Written Opinion and International Search Report issued in corresponding PCT International Patent Application Serial No. PCT/JP2018/025121, 23 pages.
Search Report, Written Opinion and International Search Report issued in corresponding PCT International Patent Application Serial No. PCT/JP2018/025123, 19 pages.

* cited by examiner (a)

(b)

(a)

(b)

CAPACITY CONTROL VALVE HAVING AN AUXILIARY COMMUNICATION PART ALLOWING COMMUNICATION WITH AN INTERMEDIATE PASSAGE

CROSS-REFERENCE TO RELATED APPLICATIONS

This application is the U.S. National Phase under 35 U.S.C. § 371 of International Application PCT/JP2018/025123, filed Jul. 3, 2018, which claims priority to Japanese Patent Application No. JP2017-133157, filed Jul. 6, 2017. The International Application was published under PCT Article 21(2) in a language other than English.

TECHNICAL FIELD

The present invention relates to a capacity control valve for controlling a flow rate or pressure of a variable capacity compressor, and, particularly, relates to a capacity control valve for controlling a discharge rate of a variable capacity compressor and the like used for an air-conditioning system for motor vehicle and the like according to a pressure load.

BACKGROUND ART

A swash plate type variable capacity compressor used for an air-conditioning system for motor vehicle and the like includes a rotating shaft rotationally driven by the rotational force of an engine, a swash plate which is coupled to the rotating shaft so that its inclination angle may be varied, a piston for compression coupled to the swash plate, and the like, and changes the inclination angle of the swash plate, thereby changing a stroke of the piston and controlling a discharge rate of a refrigerant.

By appropriately controlling pressure within a control chamber and adjusting a balancing state of the pressure acting on the both surfaces of the piston by means of a capacity control valve which is driven to be opened or closed by electromagnetic force while utilizing a suction pressure of a suction chamber for suctioning a refrigerant, a discharge pressure of a discharge chamber for discharging the refrigerant pressurized by the piston, and a control chamber pressure of the control chamber (a crank chamber) containing the swash plate, the inclination angle of the swash plate can continuously change the stroke of the piston.

As shown in FIG. 6, such a capacity control valve 160 includes: a valve section 170 having a second valve chamber 182 communicating with a discharge chamber via a second communication passage 173, a first valve chamber 183 communicating with a suction chamber via a first communication passage 171, and a third valve chamber 184 communicating with a control chamber via a third communication passage 174; a pressure-sensitive body 178 which is arranged in the third valve chamber to extend and contract by ambient pressure and which has a valve seat body 180 provided at a free end in an extension and contraction direction; a valve body 181 having a second valve part 176 for opening and closing a valve hole 177 for communicating the second valve chamber 182 and the third valve chamber 184, a first valve part 175 for opening and closing the first communication passage 171 and a circulation groove 172, and a third valve part 179 for opening and closing the third valve chamber 184 and the circulation groove 172 by engagement and disengagement to and from the valve seat body 180 in the third valve chamber 184; a solenoid section 190 for exerting an electromagnetic driving force on the valve body 181, and the like. Then, in the control capacity valve 160, without providing a clutch mechanism in a variable capacity compressor, a pressure in the control chamber (a control chamber pressure) Pc and a suction pressure Ps (a suction pressure) can be adjusted by communicating the discharge chamber and the control chamber in a case where the need to change the control chamber pressure arises (Hereinafter, it is referred to as a "conventional art". For example, see Patent Document 1.).

CITATION LIST

Patent Documents

Patent Document 1: JP 5167121 B

SUMMARY OF THE INVENTION

Problem to be Solved by the Invention

In the conventional art, if the swash plate type variable capacity compressor is stopped and then is intended to be started after a long-time standing, a liquid refrigerant (the refrigerant which is liquefied by being cooled during standing) is accumulated in the control chamber (crank chamber), and therefore it is impossible to secure a set discharge rate by compressing the refrigerant unless the liquid refrigerant is discharged. Therefore, in order to perform a desired capacity control just after start-up, the liquid refrigerant in the control chamber (crank chamber) needs to be discharged as quickly as possible.

Thus, as shown in FIG. 7 and FIG. 8, the conventional capacity control valve 160 includes a liquid refrigerant discharge function in order to discharge the liquid refrigerant in the control chamber (crank chamber) as quickly as possible at the time of start-up. That is, if the variable capacity compressor is stopped and then is intended to be started after a long-time standing, high-pressure liquid refrigerant accumulated in the control chamber (crank chamber) flows into the third valve chamber 184 from the third communication passage 174. Then, the pressure-sensitive body (bellows) 178 contracts and the third valve part 179 and the valve seat body 180 are opened therebetween. An opening area between the third valve part 179 and the valve seat body 180 is large, and therefore the liquid refrigerant can be discharged to the suction chamber out of the control chamber (crank chamber) in a short time, through the auxiliary communication passage 185, the intermediate communication passage 186 and the circulation groove 172 from the third valve chamber 184, thereby capable of quickly shifting to a cooling operation state at maximum capacity.

Subsequently, when discharge of the liquid refrigerant in the control chamber (crank chamber) is finished, the control chamber pressure Pc and the suction pressure Ps are decreased, and the third valve part 179 and the valve seat body 180 are closed therebetween. At the same time, the second valve part 176 is opened from a fully closed state by the solenoid section S and shifts to a control state. When shifted to the control state, the fluid at the discharge pressure Pd is supplied to the third valve chamber 184 from the second valve chamber 182, and thereby a differential pressure between the suction pressure Ps and the control chamber pressure Pc is changed, an inclination angle of the swash plate is changed, and a stroke (discharge capacity) of a piston is controlled.

However, in the above-described conventional art, even if a control operation begins and the third valve part 179 and the valve seat surface of the valve seat body 180 are closed therebetween, a little gap is generated between the third valve part 179 and the valve seat body 180 when the pressure of the third valve chamber 184 is fluctuated. Therefore, the fluid volume flowing to the first valve chamber 183 via the auxiliary communication passage 185 and the intermediate communication passage 186 from the third valve chamber 184 is fluctuated. As a result, the pressure of the suction chamber communicating with the first valve chamber 183 is fluctuated, and thus there was a problem that a control performance of the variable capacity compressor is deteriorated.

The present invention has been made to solve the problems the above-described conventional art has, and an object thereof is to provide a capacity control valve for controlling a flow rate or pressure of a variable capacity compressor according to a valve opening degree of a valve main body, the capacity control valve capable of making constant a fluid volume flowing to a first valve chamber from a third valve chamber even if the pressure of the third valve chamber is fluctuated and capable of improving a control performance of the variable capacity compressor.

Means for Solving Problem

To attain the above object, a capacity control valve according to a first aspect of the present invention is a capacity control valve for controlling a flow rate or pressure according to a valve opening degree of a valve section, the capacity control valve including:

a valve main body having an interior space communicating with a third communication passage through which a fluid at a control pressure passes, a second valve chamber communicating with a second communication passage through which a fluid at discharge pressure passes and having a valve hole communicating with the interior space and a second valve seat arranged in the valve hole, and a first valve chamber communicating with a first communication passage through which a fluid at a suction pressure passes and having a first valve seat;

a valve body having an intermediate communication passage communicating with the interior space and the first communication passage, a second valve part for opening and closing the valve hole by separating from and making contact with the second valve seat, a first valve part which performs opening/closing action in reverse association with the second valve part and which opens and closes communication between the intermediate communication passage and the first communication passage by separating from and making contact with the first valve seat, and a shaft part arranged in the interior space;

a pressure-sensitive body which is arranged in the interior space and extends and contracts in response to the pressure of the interior space and which has a free end part sliding with the shaft part of the valve body;

an auxiliary communication part which is arranged in the interior space and which allows communication between the interior space and the intermediate communication passage; and a solenoid section which is mounted to the valve main body and actuates the valve body to opening/closing direction according to current.

According to the first aspect, a fluid volume flowing to the first valve chamber from the interior space is adjusted by the auxiliary communication part arranged in the interior space, thereby capable of improving operation efficiency of a variable capacity compressor.

In the capacity control valve according to a second aspect of the present invention, the auxiliary communication part has an opening area smaller than a flow passage cross-sectional area of the intermediate communication passage.

According to the second aspect, the auxiliary communication part serves as a bottleneck, and therefore the fluid flowing to the first valve chamber from the interior space is adjusted by adjusting only the auxiliary communication passage, thereby capable of improving operation efficiency of the variable capacity compressor.

In the capacity control valve according to a third aspect of the present invention, the auxiliary communication part is a hole part arranged in the valve body.

According to the third aspect, the opening area of the auxiliary communication part can be adjusted by adjusting the diameter of the hole part.

In the capacity control valve according to a fourth aspect of the present invention, the auxiliary communication part has an opening area larger than a gap part between the shaft part of the valve body and the free end part of the pressure-sensitive body.

According to the fourth aspect, even if flow passages leading to the first valve chamber from the interior space exist in parallel to each other, the fluid volume flowing to the first valve chamber from the interior space can be adjusted by adjusting only the auxiliary communication part.

In the capacity control valve according to a fifth aspect of the present invention, the valve body includes a plurality of the auxiliary communication parts.

According to the fifth aspect, the opening area of the auxiliary communication parts can be adjusted by adjusting the number of the auxiliary communication parts.

In the capacity control valve according to a sixth aspect of the present invention, the auxiliary communication part is made up of a gap part between the shaft part of the valve body and the free end part of the pressure-sensitive body.

According to the sixth aspect, the fluid volume flowing to the first valve chamber from the interior space is adjusted by adjusting the gap part between the shaft part of the valve body and the free end part of the pressure-sensitive body, thereby capable of improving operation efficiency of the variable capacity compressor.

DESCRIPTION OF EMBODIMENTS

Figure 1:
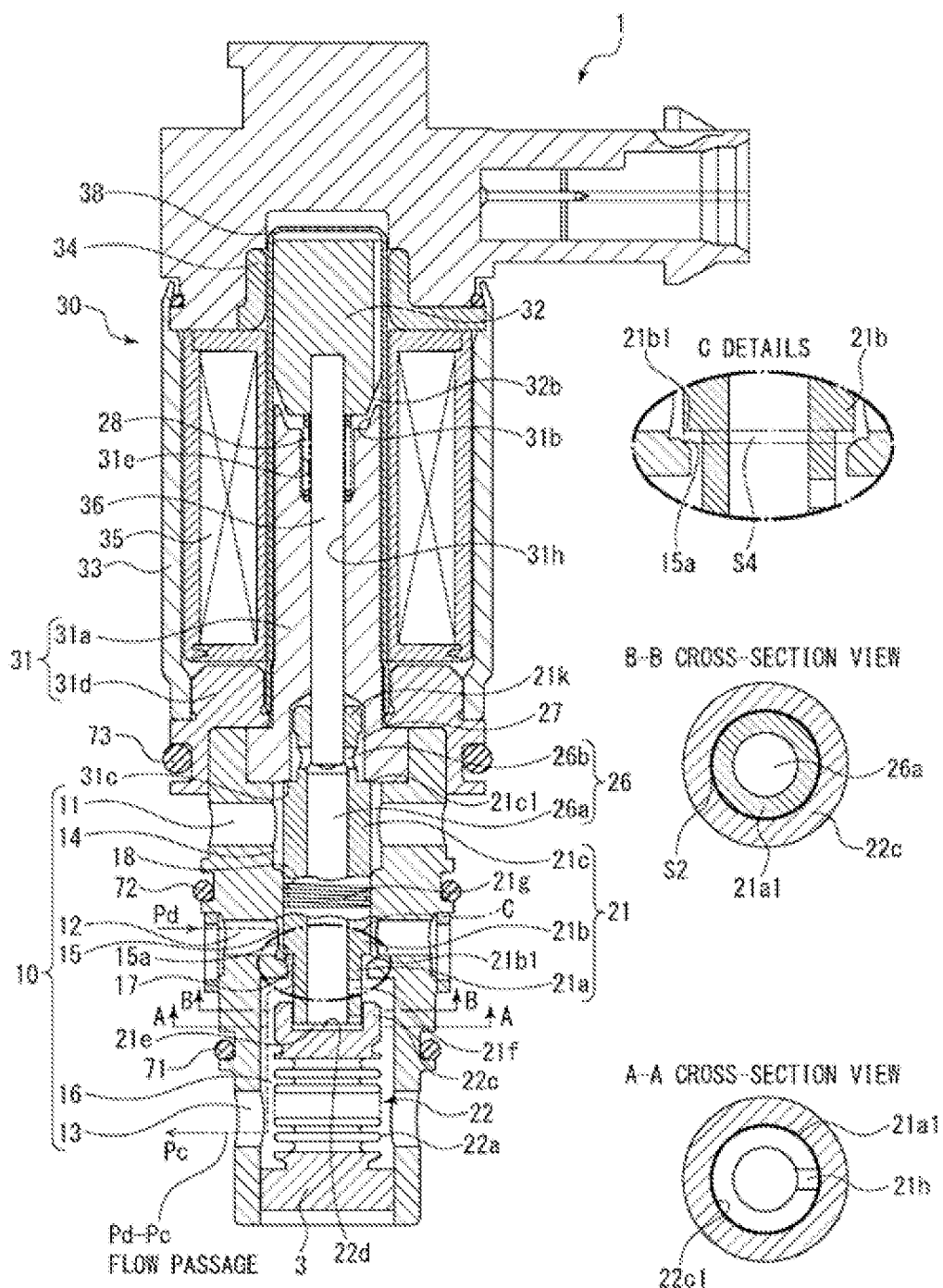
FIG. 1 is a front cross-sectional view showing a capacity control valve according to the present invention.

Hereinafter referring to the drawings, modes for carrying out the present invention will be described illustratively based on an embodiment. However, the dimensions, materials, shapes, relative arrangements, and others of components described in the embodiment are not intended to limit the scope of the present invention only to them unless otherwise described explicitly.

Figure 2:
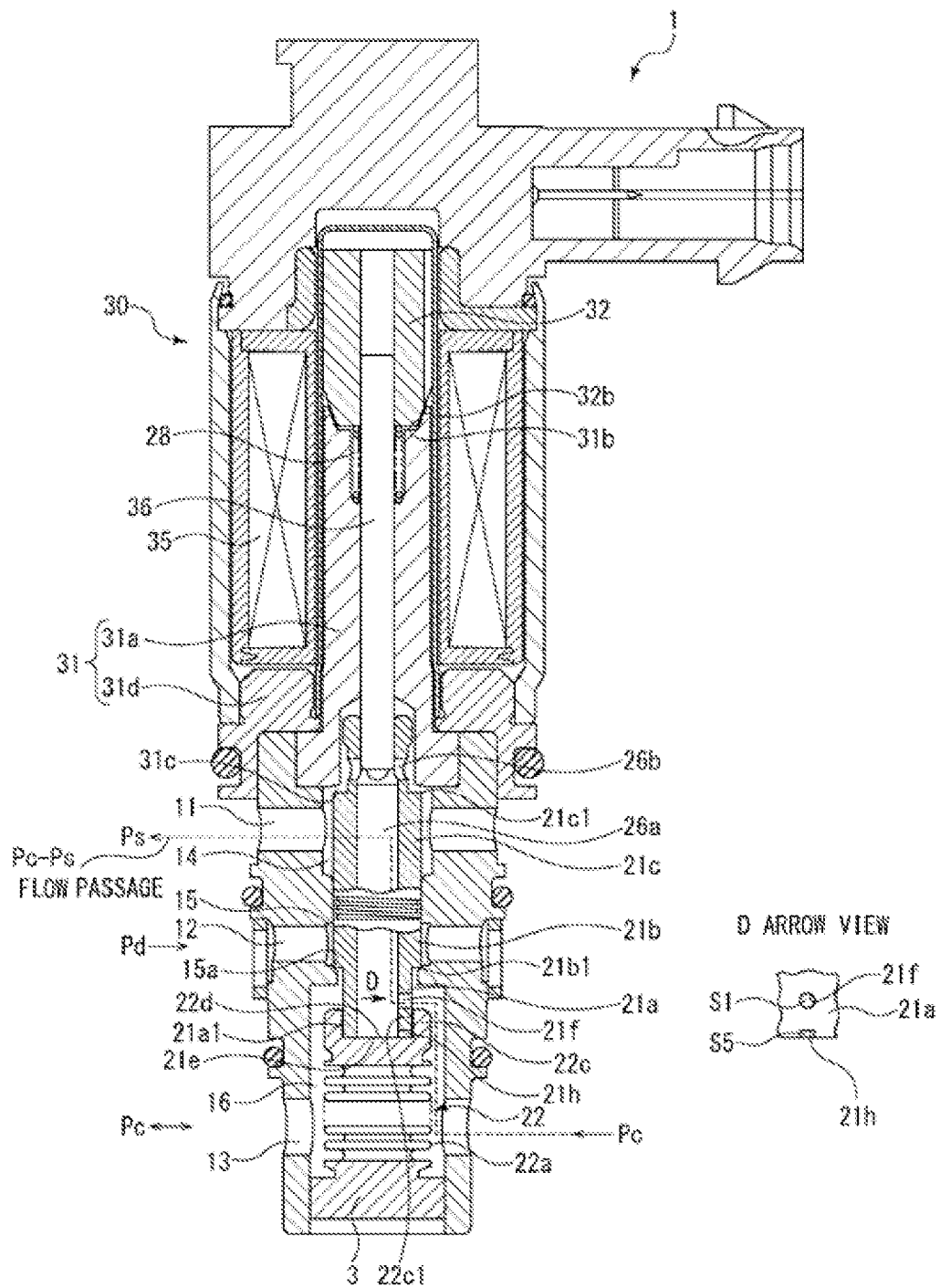
FIG. 2 is a front cross-sectional view showing the capacity control valve according to the present invention, and shows a state of low current control.
Figure 3:
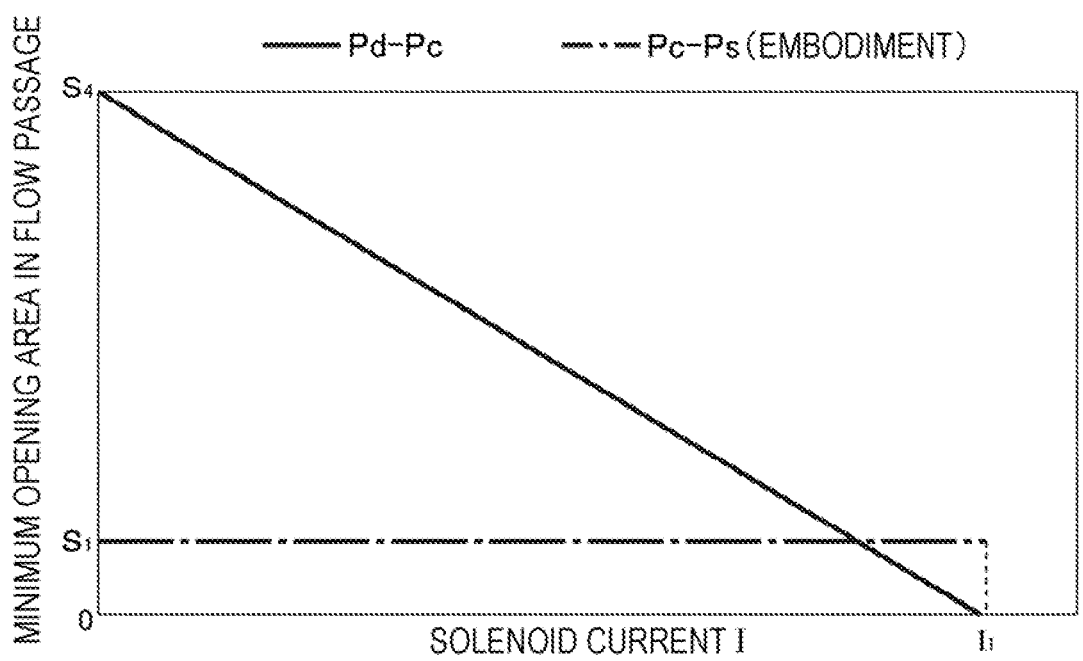
FIG. 3 is an explanatory diagram for explaining a relationship between opening areas of a Pc-Ps flow passage and a Pd-Pc flow passage and a solenoid current of the capacity control valve according to the present invention.

Referring to FIG. 1 to FIG. 3, a capacity control valve according to a first embodiment of the present invention will be described. In FIG. 1, 1 denotes a capacity control valve. The capacity control valve 1 mainly consists of a valve main body 10, a valve body 21, a pressure-sensitive body 22, and a solenoid 30. Hereinafter, the main configuration of the capacity control valve 1 will be described.

The valve main body 10 is composed of a metal such as brass, iron, aluminum, or stainless steel, a synthetic resin material, or the like. The valve main body 10 is a hollow cylindrical member having a through hole penetrating in an axial direction, and in a compartment of the through hole, a first valve chamber 14, a second valve chamber 15 adjacent to the first valve chamber 14, and an interior space 16 adjacent to the second valve chamber 15 are sequentially arranged.

To the second valve chamber 15, a second communication passage 12 is consecutively provided. The second communication passage 12 is configured to communicate with a discharge chamber (not shown) of a variable capacity compressor such that a fluid at a discharge pressure Pd can flow into the interior space 16 from the second valve chamber 15 by opening and closing of the capacity control valve 1.

To the interior space 16, a third communication passage 13 is consecutively provided. The third communication passage 13 is communicated with a control chamber (not shown) of the variable capacity compressor, and allows the fluid at the discharge pressure Pd flowed into the interior space 16 from the second valve chamber 15 by opening and closing of the capacity control valve 1 to flow out to the control chamber (crank chamber) of the variable capacity compressor and allows the fluid at a control chamber pressure Pc flowed into the interior space 16 to flow out to a suction chamber of the variable capacity compressor through the first valve chamber 14 via an intermediate communication passage 26 described later.

Further, in the first valve chamber 14, a first communication passage 11 is consecutively provided. The first communication passage 11 allows the fluid at the control chamber pressure Pc flowed into the interior space 16 from the control chamber (crank chamber) of the variable capacity compressor to flow out to the suction chamber through the first valve chamber 14 via the intermediate communication passage 26 described later.

Between the second valve chamber 15 and the interior space 16, a valve hole 17 having a smaller diameter than the diameters of these chambers is consecutively provided, and around the valve hole 17 on the second valve chamber 15 side, a second valve seat 15a is formed. Moreover, between the first valve chamber 14 and the second valve chamber 15, a hole part 18 having a smaller diameter than the diameters of these chambers is consecutively provided.

In addition, the first communication passage 11, the second communication passage 12, and the third communication passage 13 penetrate through a peripheral surface of the valve main body 10 respectively, for example, at two equal intervals to six equal intervals. Further, on an outer peripheral surface of the valve main body 10, mounting grooves for O-rings are provided at three positions apart from each other in the axial direction. Then, to the respective mounting grooves, O rings 71, 72, 73 to seal between the valve main body 10 and a mounting hole (not shown) of a casing to which the valve main body 10 is fitted is mounted, and each of the first communication passage 11, the second communication passage 12, and the third communication passage 13 is configured as an independent flow passage.

In the interior space 16, the pressure-sensitive body 22 is arranged. In the pressure-sensitive body 22, one end part of a metallic bellows 22a is sealingly coupled to a partition adjustment part 3. This bellows 22a is manufactured by phosphor bronze, stainless, or the like, and is designed such that its spring constant is a predetermined value. An interior of the pressure-sensitive body 22 is a vacuum or air exists therein. Then, with respect to an effective pressure receiving area of the bellows 22a of the pressure-sensitive body 22, the pressure-sensitive body 24 is extended and contracted according to the pressure in the interior space 16, and the valve body 21 is configured to actuate a predetermined driving force. On a free end part side of the pressure-sensitive body 22 moving so as to extend and contract in response to the suction pressure in the interior space 16, a free end part 22c is arranged.

Then, the partition adjustment part 3 of the pressure-sensitive body 22 is sealingly fitted and fixed so as to block the interior space 16 of the valve main body 10. In addition, if the partition adjustment part 3 is screwed, or fixed by a set screw (not shown), spring force of compression springs arranged in parallel within the bellows 22a or of the bellows 22a can be adjusted to be moved in the axial direction.

Next, the valve body 21 will be described. The valve body 21 is made of a hollow cylindrical member. The valve body 21 mainly consists of a fourth shaft part 21k integrally coupled to a solenoid rod 36 described later, a first shaft part 21c provided consecutively to the fourth shaft part 21k and formed to have a diameter larger than that of the fourth shaft part 21k, a labyrinth part 21g provided consecutively to the first shaft part 21c, a second shaft part 21b provided consecutively to the labyrinth 21g, and a third shaft part 21a (a shaft part according to the present invention) provided consecutively to the second shaft part 21b and formed to have a diameter smaller than that of the second shaft part 21b. The first shaft part 21c and the second shaft part 21b are arranged on the first valve chamber 14 side and the second valve chamber 15 side across the labyrinth part 21g, and the labyrinth part 21g slides with the hole part 18 formed between the first valve chamber 14 side and the second valve chamber 15 side and seals the first valve chamber 14 and the second valve chamber 15. Thereby, the first valve chamber 14 and the second valve chamber 15 are configured as independent valve chambers.

Moreover, at an end part of the first shaft part 21c arranged in the first valve chamber 14, a first valve part 21c1 is formed, and the first valve part 21c1 opens and closes communication between the intermediate communication passage 26 and the first valve chamber 14 by separating from and making contact with a first valve seat 31c formed on an end surface of a stator core 31 of the solenoid 30 described later. At an end part of the second shaft part 21b arranged in the second valve chamber 15, a second valve part 21b1 is formed, and the second valve part 21b1 opens and closes the valve hole 17 for communicating the second valve chamber 15 and the interior space 16 by separating from and making contact with the second valve seat 15a.

Further, the valve body 21 has an intermediate communication passage 26 penetrating a center part thereof. The intermediate communication passage 26 consists of a first intermediate communication passage 26a penetrating in its axial direction, and a second intermediate communication passage 26b which is formed in the fourth shaft part 21k and which communicates the first intermediate communication passage 26a and the first valve chamber 14.

Figure 9:
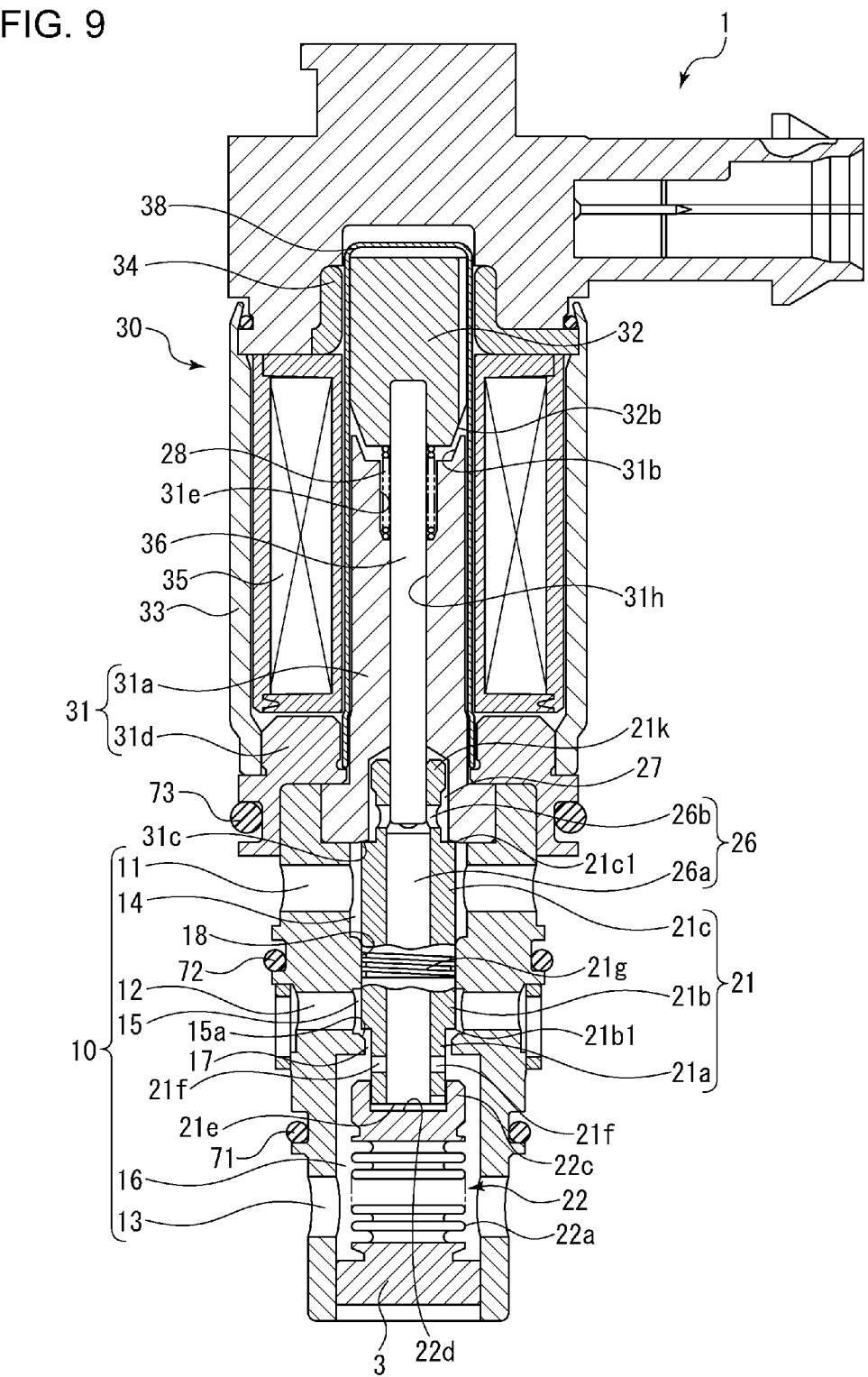
FIG. 9 is a front cross-sectional view showing a capacity control valve according to the present invention.

An end part 21a1 of the third shaft part 21a of the valve body 21 is relatively slidably fitted in a hole part 22c1 of the free end part 22c of the pressure-sensitive body 22. Moreover, in the third shaft part 21a, an auxiliary communication part 21f (or multiple auxiliary communication parts as shown in FIG. 9) made up of a hole penetrating in a radial direction is formed, and the intermediate communication passage 26 and the interior space 16 are communicated with each other by the auxiliary communication part 21f. Here, an opening area S1 of the auxiliary communication part 21f is formed to be sufficiently larger than a gap area S2 between the end part 21a1 of the third shaft part 21a and the hole part 22c1 of the pressure-sensitive body 22. Moreover, a fitting length of the end part 21a1 of the third shaft part 21a and the hole part 22c1 of the pressure-sensitive body 22 is set larger than a displacement amount of the free end part 22c of the pressure-sensitive body 22 by the pressure in the interior space 16, and the fitting state is always maintained. As the flow passage leading to the intermediate communication passage 26 from the interior space 16, two routes of a flow passage leading to the intermediate communication passage 26 through the auxiliary communication part 21f from the interior space 16 (hereinafter, described as a "first passage".) and a flow passage leading to the intermediate communication passage 26 through the gap between the end part 21a1 of the third shaft part 21a and the hole part 22c1 of the pressure-sensitive body 22 from the interior space 16 (hereinafter, described as a "second passage".) exist in parallel to each other. The opening area S1 of the first flow passage is sufficiently larger than the gap area S2 of the second flow passage, and therefore the fluid almost flows through the first flow passage and hardly flows through the second flow passage.

Moreover, a groove part 21h is formed in an end part 21a1 of the third shaft part 21a of the valve body 21, and an opening area S5 of the groove part 21h is set larger than the gap area S2 of the second flow passage. Here, if the groove part 21h is not provided in the end part 21a1 of the valve body 21, from the state that an end part 21e of the valve body 21 contacts an end surface 22d of the pressure-sensitive body 22, that is, the state that the area between the end part 21e of the valve body 21 and the end surface 22d of the pressure-sensitive body 22 is zero (FIG. 2), the area is suddenly changed when the end part 21e of the valve body 21 is separated from the end surface 22d of the pressure-sensitive body 22 (FIG. 1). Then, the fluid volume flowing through the second flow passage is fluctuated, and therefore the fluid volume flowing through the first flow passage cannot be maintained constant. Thus, by providing the groove part 21h in the end part 21a1 of the valve body 21, sudden change of the area by contact and separation of the end part 21e of the valve body 21 and the end surface 22d of the pressure-sensitive body 22 is mitigated, thereby the fluid volume flowing through the first flow passage can be maintained constant.

Next, the solenoid 30 will be described. The solenoid 30 is constituted by a solenoid rod 36 (a rod according to the present invention), a plunger case 38, a plate 34, an electromagnetic coil 35, a stator core 31 consisting of a center post 31a and a base part 31d arranged in an inner peripheral part of the electromagnetic coil 35, a plunger 32, and a biasing means 28 arranged between the plunger 32 and the center post 31a which are contained in a solenoid case 33. The valve body 21 and the plunger 32 are coupled by the solenoid rod 36 movably fitted in a through hole 31h of the stator core 31, and the valve body 21 and the plunger 32 are integrally driven.

Between the center post 31a of the stator core 31 and the plunger 32, the biasing means 28 for biasing the plunger 32 so as to be separated from the stator core 31 is arranged. That is, the biasing means 28 biases the first valve part 21c1 so as to be in a closed state from an opened state and the second valve part 21b1 so as to be in an opened state from a closed state.

The plunger case 38 is a bottomed hollow cylindrical member whose one end is opened. An open end of the plunger case 38 is sealingly fixed to the base part 31d of the stator core 31, and between a bottom part of the plunger case 38 and the center post 31a of the stator core 31, the plunger 32 is movably arranged in the axial direction. Thereby, the electromagnetic coil 35 is sealed by the plunger case 38, the base part 31d of the stator core 31, and the solenoid case 33, and does not contact the refrigerant, and therefore it is possible to prevent reduction in insulation resistance.

The operation of the capacity control valve 1 having the configuration described above will be described with reference to FIG. 1 to FIG. 3. In addition, the flow passage leading to the first valve chamber 14 through the intermediate communication passage 26 from the interior space 16 is hereinafter described as a "Pc-Ps flow passage". Moreover, a flow passage leading to the interior space 16 through the valve hole 17 from the second valve chamber 15 is hereinafter described as a "Pd-Pc flow passage". FIG. 3 shows a relationship between a solenoid current and a minimum flow passage cross-sectional area of each flow passage. The dot and dash line in FIG. 3 shows a relationship between the solenoid current and the minimum flow passage cross-sectional area in the Pc-Ps flow passage, and the solid line in FIG. 3 shows a relationship between the solenoid current and the minimum flow passage cross-sectional area in the Pd-Pc flow passage.

As shown in FIG. 1, in a state that the electromagnetic coil 35 of the solenoid 30 is not energized, that is, in a state of a solenoid current I=0 in FIG. 3, a maximum air gap is formed between an attraction surface 31b of the stator core 31 and an operation surface 32b of the plunger 32 by repulsion of the biasing means 28, and the second valve part 21b1 is opened. Therefore, in the state of the solenoid current I=0, an opening area S4 of the second valve part 21b1 in the Pd-Pc flow passage becomes maximum. On the other hand, the opening area S1 of the auxiliary communication part 21f is the minimum opening area in the Pc-Ps flow passage leading to the first valve chamber 14 through the intermediate communication passage 26 from the interior space 16.

Next, the state that energization to the solenoid 30 is started and the solenoid current is below a first current value I1 (0<I<I1), that is, a control state will be described with reference to FIG. 1 to FIG. 3. The control state is a state that the capacity control valve is controlled such that the pressure of the suction chamber is a set value Pset. When energization to the solenoid is started, the operation surface 32b of the plunger 32 is gradually attracted to the attraction surface 31b of the stator core 31, and the opening area of the second valve part 21b1 is gradually narrowed in inverse proportion to the solenoid current. Therefore, as shown in FIG. 3, in the state that the solenoid current is below the first current value I1 (0<I<I1), the opening area S4 of the second valve part 21b1 is gradually narrowed, and therefore the area of the Pd-Pc flow passage is also gradually reduced according to an increase in current.

On the other hand, as shown in FIG. 3, the minimum flow passage cross-sectional area of the Pc-Ps flow passage is determined by the area of the auxiliary communication part 21f, and therefore the area of the Pc-Ps flow passage is maintained at a constant value S1 regardless of magnitude of current supplied to the solenoid in the control state of the solenoid. Thereby, the fluid volume flowing through the Pc-Ps flow passage can be easily adjusted to be constant. In this way, the fluid volume flowing through the Pc-Ps flow passage can be easily adjusted only by adjusting the size of the opening area S1 of the auxiliary communication part 21f, and therefore in the control state, a constant volume of fluid can be allowed to flow to the first valve chamber 14 from the interior space 16, and thus the pressure of the suction chamber communicating with the first valve chamber 14 can be stabilized, thereby capable of improving controllability of the variable capacity compressor.

The configuration of the capacity control valve 1 according to the first embodiment of the present invention is described above and exhibits the following excellent effects.

By setting the opening area S1 of the auxiliary communication part 21f to the minimum among the Pc-Ps flow passage, the fluid volume flowing through the Pc-Ps flow passage can be easily adjusted only by adjusting the size of the opening area S1 of the auxiliary communication part 21f, and therefore in the control state, constant fluid can be allowed to flow to the first valve chamber 14 from the interior space 16, and thus the pressure of the suction chamber communicating with the first valve chamber 14 can be stabilized, thereby capable of improving controllability of the variable capacity compressor.

Moreover, in the capacity control valve 1, the pressure-sensitive body 22 and the valve body 21 are relatively displaced in the interior space 16, and therefore the gap area S2 exists between the end part 21a1 of the third shaft part 21a and the hole part 22c1 of the pressure-sensitive body 22. Therefore, as the Pc-Ps flow passage, two routes of the Pc-Ps flow passage via the first flow passage and the Pc-Ps flow passage via the second flow passage exist. Also in such a case, by sufficiently increasing the opening area S1 with respect to the gap area S2, the fluid can be allowed to almost flow through the first flow passage and hardly flow through the second flow passage. Thereby, even if the Pc-Ps flow passages exist in parallel, the fluid volume flowing to the first valve chamber 14 from the interior space 16 can be adjusted only by adjusting the size of the opening area S1 of the auxiliary communication part 21f.

Hereinbefore, although the embodiment of the present invention has been described by the drawings, its specific configuration is not limited to the embodiment, and any changes and additions made without departing from the scope of the present invention are included in the present invention.

In the above embodiment, by providing the groove part 21h in the end part 21a1 of the third shaft part 21a of the valve body 21, sudden change of the area by contact and separation of the end part 21e of the valve body 21 and the end surface 22d of the pressure-sensitive body 22 is mitigated, thereby a flow rate flowing to the first valve chamber from the interior space 16 is maintained constant. However, the mitigation method for the change of flow rate by contact and separation of the end part 21e of the valve body 21 and the end surface 22d of the pressure-sensitive body 22 is not limited thereto.

Figure 4:
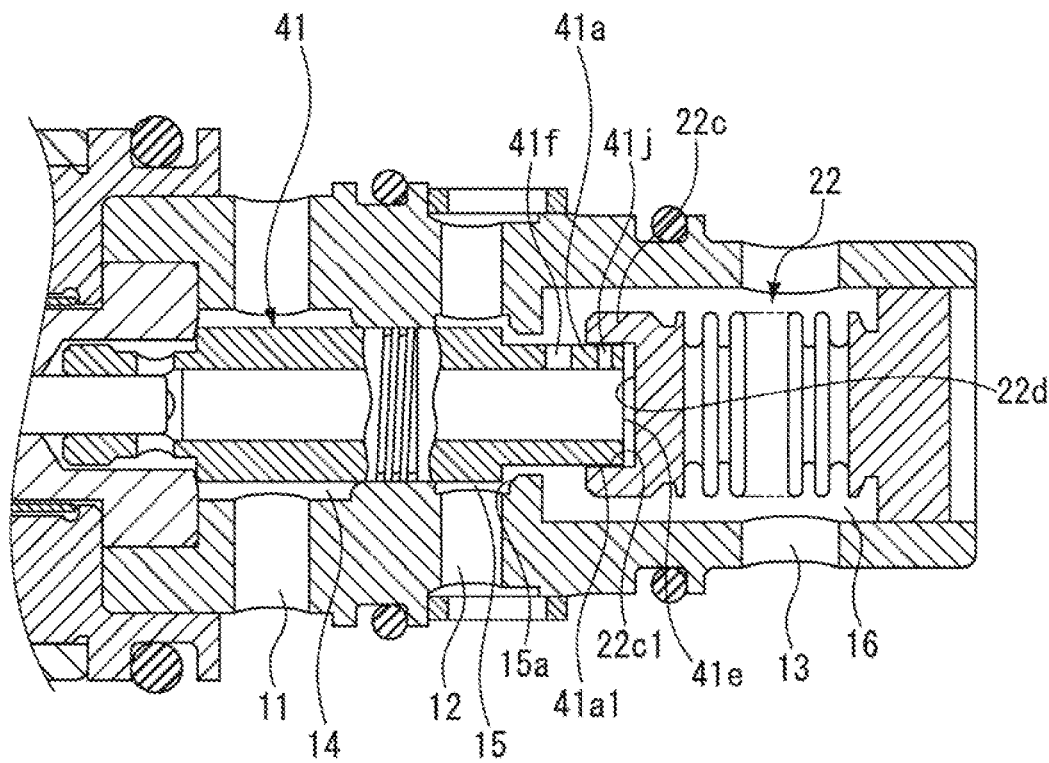
FIG. 4 is a partial cross-sectional view of the capacity control valve of a modification of the present invention.
Figure 4:
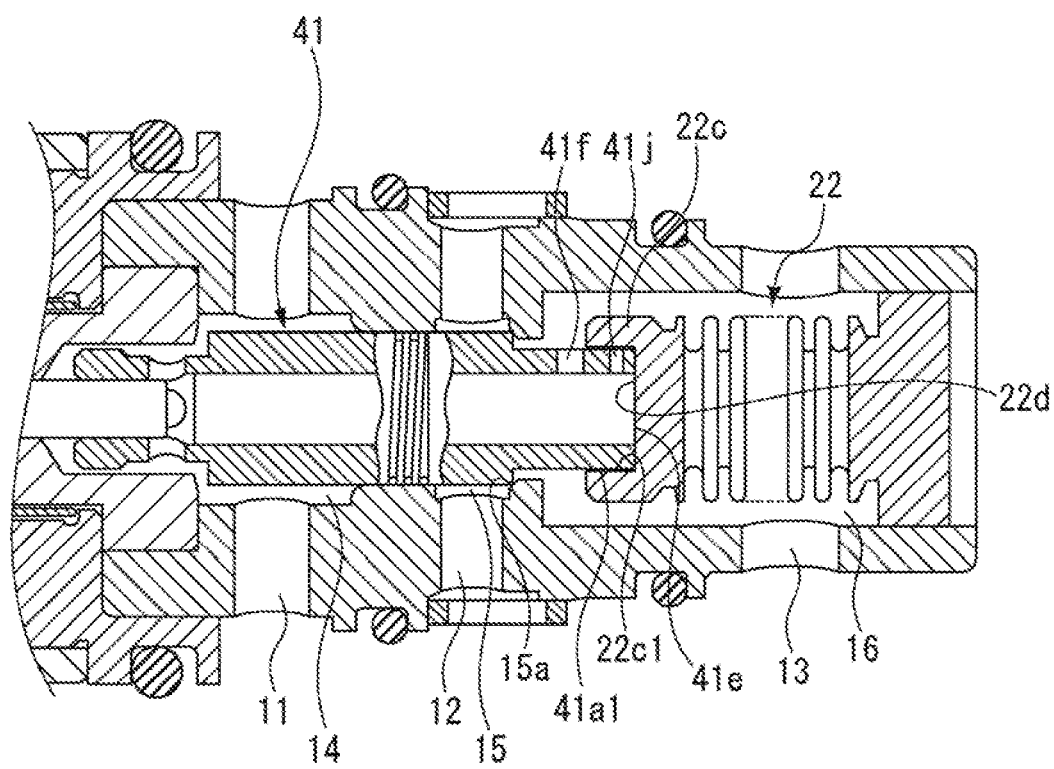

For example, as shown in FIG. 4, by providing an opening hole 41j in an end part 41a1 of a valve body 41, even if the state that an end part 41e of the valve body 41 and the end surface 22d of the pressure-sensitive body 22 are separated from each other as shown in FIG. 4A and the state that the end part 41e of the valve body 41 and the end surface 22d of the pressure-sensitive body 22 are in contact with each other as shown in FIG. 4B are repeated, the change of flow rate can be mitigated.

Further, as another modification, by blocking an opening part of the end part 21a1 of the valve body 21 with a plug or the like, the fluid volume flowing through the Pc-Ps flow passage via the second flow passage can be set to zero. In this case, a fluid draining hole or the like is provided such that an enclosed space is not formed between the end part 21a1 of the valve body 21 and the free end part 22c of the pressure-sensitive body 22, thereby it is prevented from being resistance when the valve body 21 and the pressure-sensitive body 22 are relatively displaced.

Figure 5:
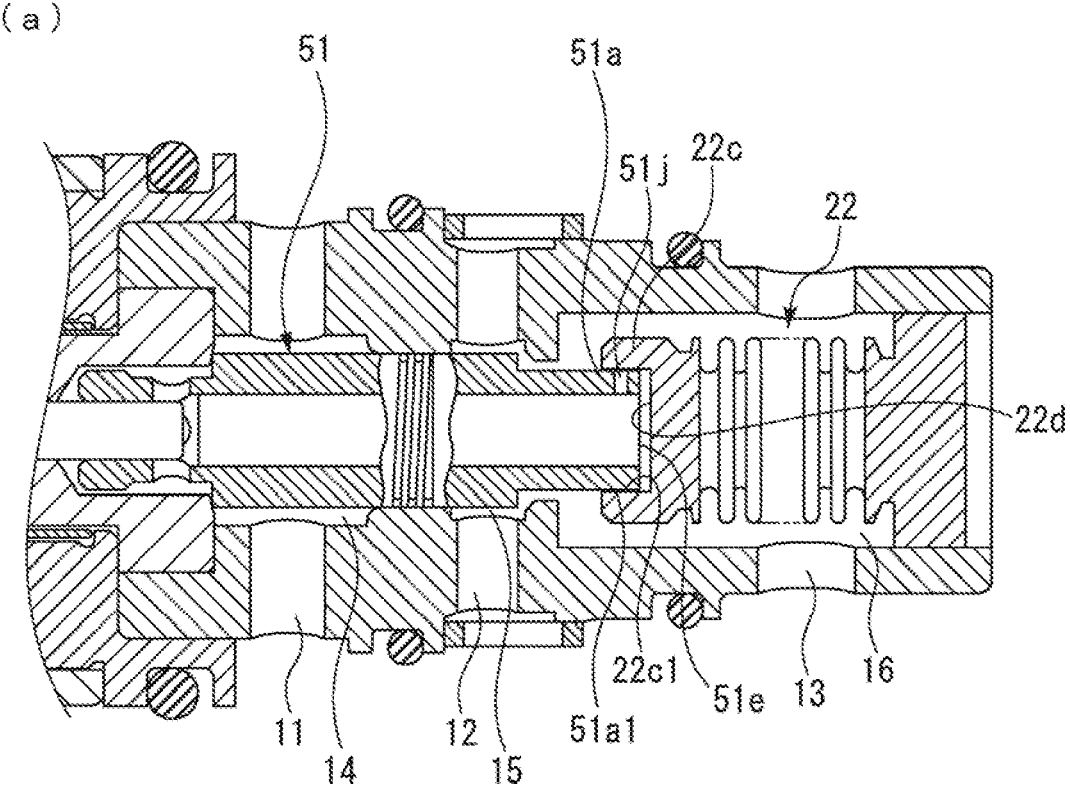
FIG. 5 is a partial cross-sectional view of the capacity control valve of another modification of the present invention.
Figure 5:
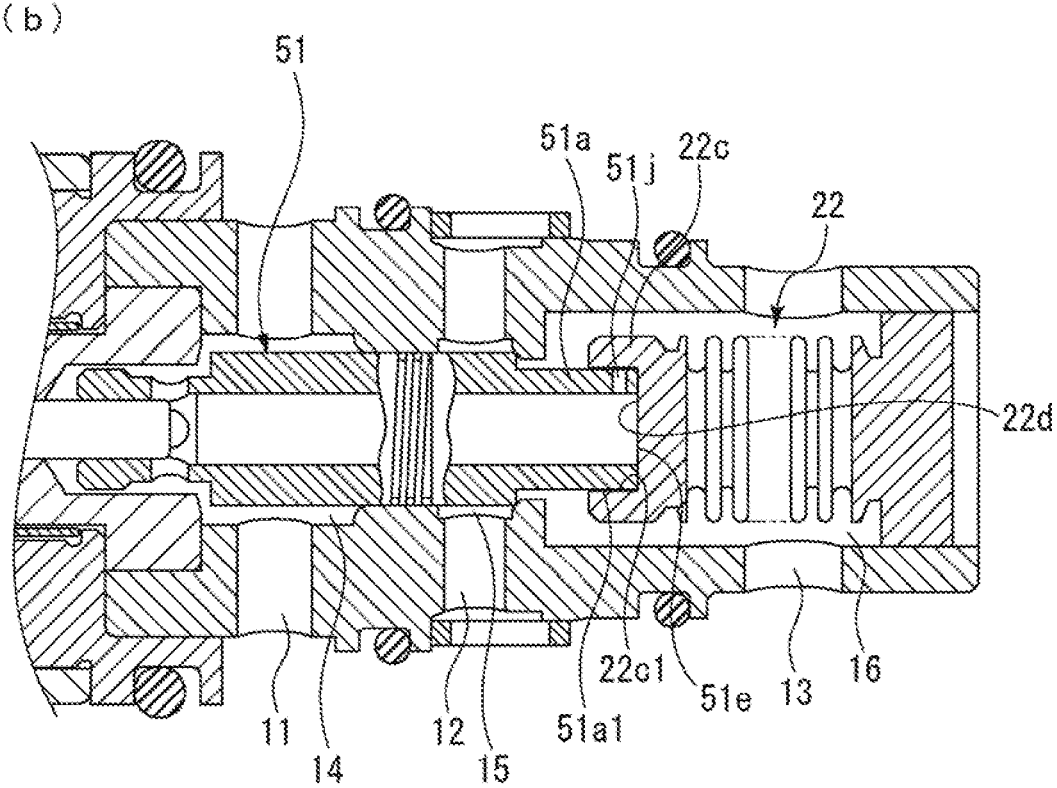
Figure 6:
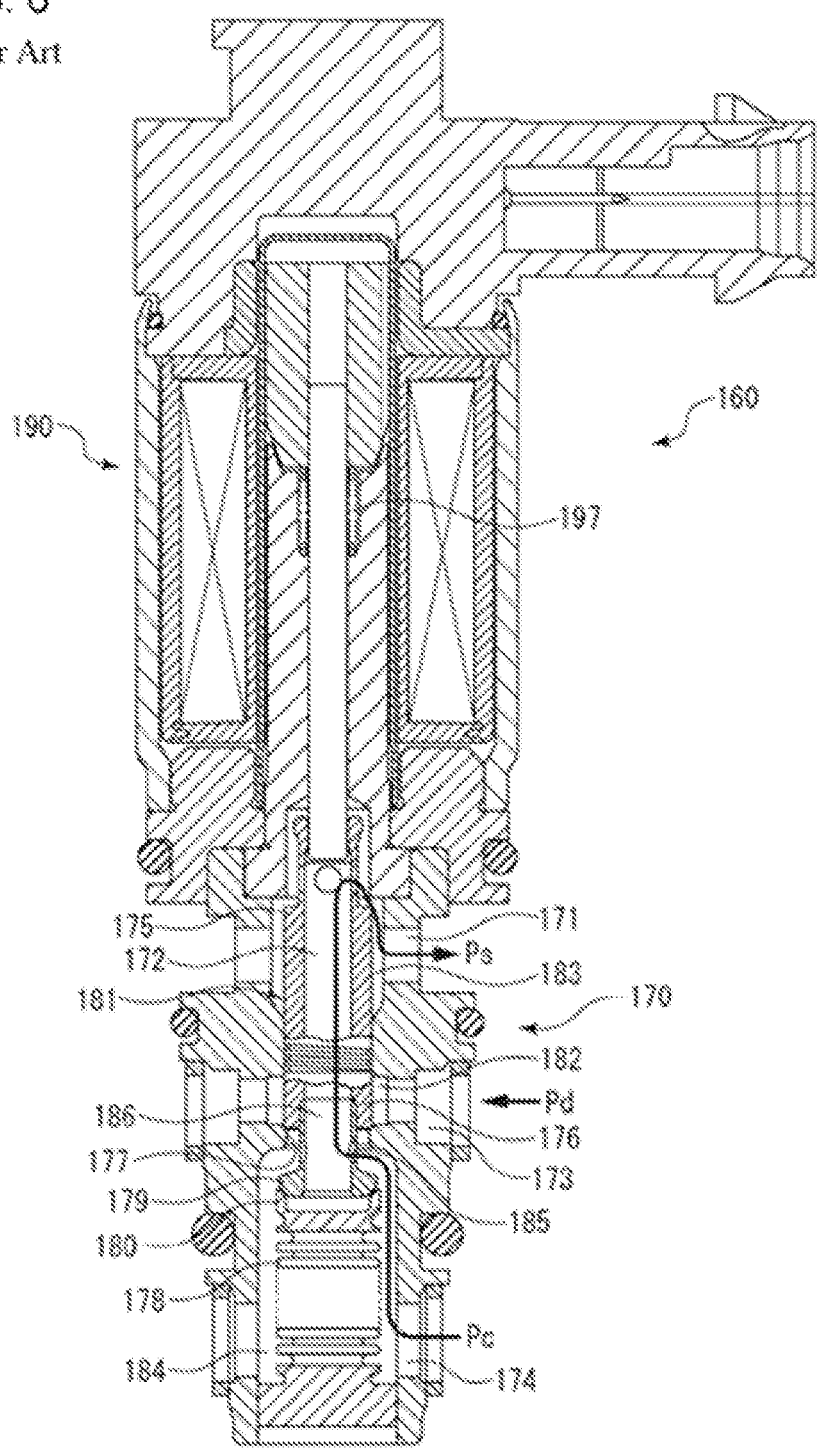
FIG. 6 is a diagram showing a state of the conventional capacity control valve at the time of low current control.
Figure 7:
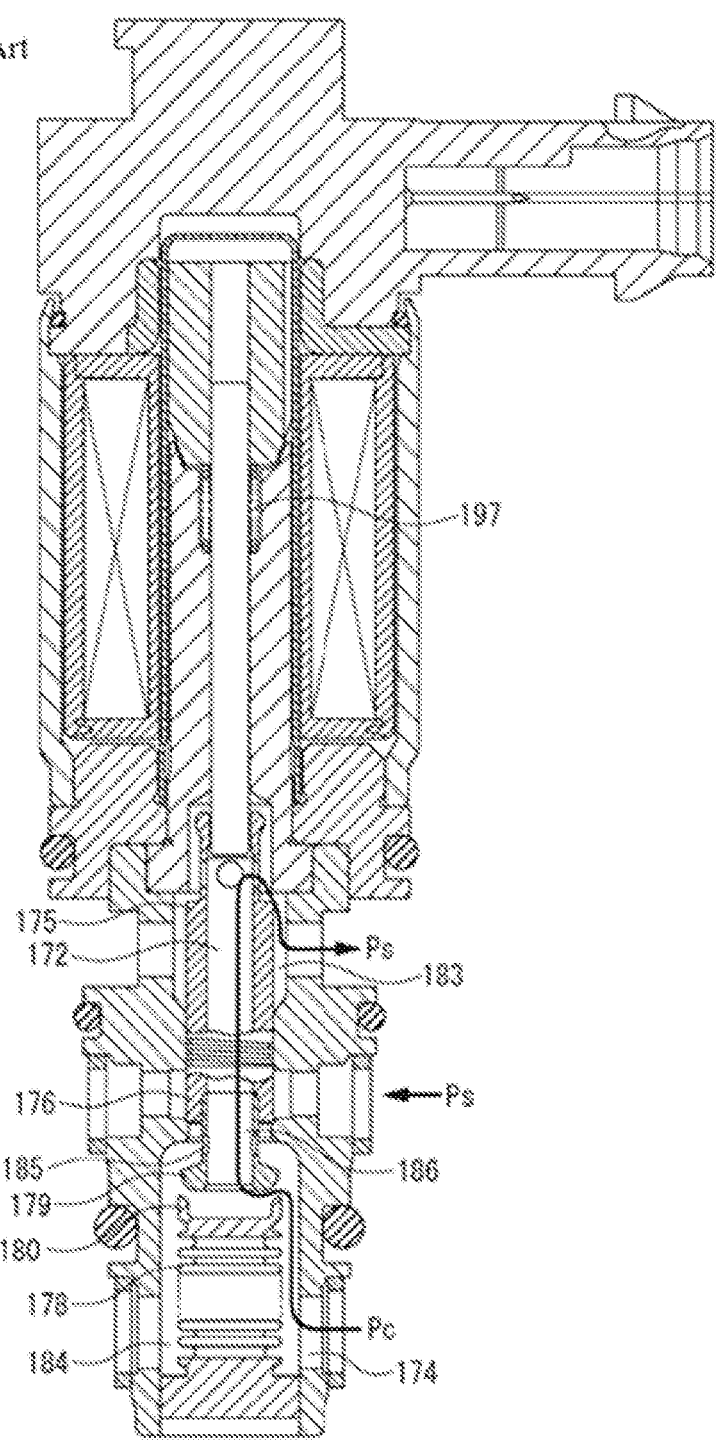
FIG. 7 is a diagram showing the conventional capacity control valve in a state of discharging the liquid refrigerant.
Figure 8:
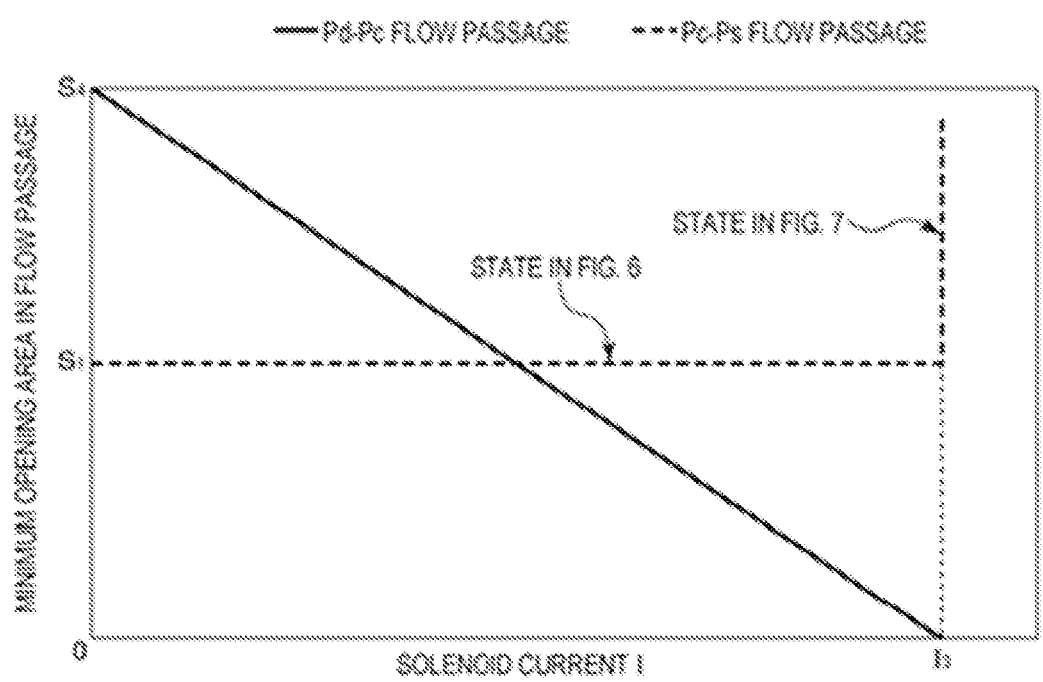
FIG. 8 is an explanatory diagram for explaining a relationship between the opening areas of the Pc-Ps flow passage and the Pd-Pc flow passage and the solenoid current of the conventional capacity control valve.

Moreover, in the above embodiment, although the fluid volume flowing through the Pc-Ps flow passage is adjusted by adjusting the opening area S1 of the auxiliary communication part 21f, the minimum opening area of the Pc-Ps flow passage may be adjusted without providing the auxiliary communication part 21f. For example, as shown in FIG. 5, by adjusting the gap area between an end part 51a1 of a valve body 51 and the hole part 22c1 of the pressure-sensitive body 22, the fluid volume flowing through the Pc-Ps flow passage may be adjusted to be constant. Also in this case, by providing an opening hole 51j in the end part 51a1 of the valve body 51, even if the state that an end part 51e of the valve body 51 and the end surface 22d of the pressure-sensitive body 22 are separated from each other as shown in FIG. 5A and the state that the end part 51e of the valve body 51 and the end surface 22d of the pressure-sensitive body 22 are in contact with each other as shown in FIG. 5B are repeated, the change of flow rate can be prevented.

REFERENCE SIGNS LIST 1 capacity control valve
3 partition adjustment part
10 valve main body
11 first communication passage
12 second communication passage
13 third communication passage
14 first valve chamber
15 second valve chamber
15a second valve seat
16 interior space
21 valve body
21a third shaft part
21a1 end part
21b second shaft part
21b1 second valve part
21c first shaft part
21c1 first valve part
21f auxiliary communication part
21h groove part
22 pressure-sensitive body 22c free end part
26 intermediate communication passage
30 solenoid
31c first valve seat
Pd discharge chamber pressure
Ps suction chamber pressure
Pc control chamber pressure
S1 opening area of auxiliary communication part
S2 gap area between end part of valve body and hole part of pressure-sensitive body
S4 opening area between second valve part and second valve seat
S5 opening area of groove part

The invention claimed is:

1. A capacity control valve for controlling a flow rate or pressure according to a valve opening degree of a valve section, comprising:
 (i) valve main body having:
  an interior space communicating with a third communication passage through which a fluid at a control pressure passes,
  a second valve chamber communicating with a second communication passage through which a fluid at discharge pressure passes and having a valve hole communicating with the interior space and a second valve seat arranged in the valve hole, and
  a first valve chamber communicating with a first communication passage through which a fluid at a suction pressure passes and having a first valve seat;
 (ii) a valve body having:
  an intermediate communication passage communicating with the interior space and the first communication passage,
  a second valve part for opening and closing the valve hole by separating from and making contact with the second valve seat,
  a first valve part which performs opening/closing action in reverse association with the second valve part and which opens and closes communication between the intermediate communication passage and the first communication passage by separating from and making contact with the first valve seat,
  a shaft part arranged in the interior space, and
  an auxiliary communication part which is arranged in the interior space and which allows communication between the interior space and the intermediate communication passage;
 (iii) a pressure-sensitive body which is arranged in the interior space and extends and contracts in response to the suction pressure in the interior space and which has a bellows wherein one end of the bellows is a free end part, and another end of the bellows is fixed to the valve main body, wherein the free end part of the pressure-sensitive body is provided with a hole part to which an end part of the shaft part is fitted in a manner being relatively slidable against each other,
  wherein a slidably-fitting length, over which the end part of the shaft part and the hole part of the free end part of the bellows relatively slide against each other in an axial direction of the shaft part and the bellows, is set larger than a displacement length of the free end part of the bellows displaced by the suction pressure in the interior space in the axial direction, so that the end part of the shaft part and the free end part of the bellows are constantly in a fitted state; and
 (iv) a solenoid section which is mounted to the valve main body and actuates the valve body in an opening/closing direction according to current.

2. The capacity control valve according to claim 1, wherein the auxiliary communication part has an opening area smaller than a flow passage cross-sectional area of the intermediate communication passage.

3. The capacity control valve according to claim 2, wherein the auxiliary communication part has an opening area larger than a gap part between the shaft part of the valve body and the free end part of the pressure-sensitive body.

4. The capacity control valve according to claim 3, wherein the valve body includes plurality numbers of the auxiliary communication part.

5. The capacity control valve according to claim 2, wherein the valve body includes plurality numbers of the auxiliary communication part.

6. The capacity control valve according to claim 2, wherein the auxiliary communication part is made up of a gap part between the shaft part of the valve body and the free end part of the pressure-sensitive body.

7. The capacity control valve according to claim 2, wherein the auxiliary communication part is a hole part arranged in the valve body.

8. The capacity control valve according to claim 7, wherein the auxiliary communication part has an opening area larger than a gap part between the shaft part of the valve body and the free end part of the pressure-sensitive body.

9. The capacity control valve according to claim 8, wherein the valve body includes plurality numbers of the auxiliary communication part.

10. The capacity control valve according to claim 7, wherein the valve body includes plurality numbers of the auxiliary communication part.

11. The capacity control valve according to claim 1, wherein the auxiliary communication part is a hole part arranged in the valve body.

12. The capacity control valve according to claim 11, wherein the auxiliary communication part has an opening area larger than a gap part between the shaft part of the valve body and the free end part of the pressure-sensitive body.

13. The capacity control valve according to claim 12, wherein the valve body includes plurality numbers of the auxiliary communication part.

14. The capacity control valve according to claim 11, wherein the valve body includes plurality numbers of the auxiliary communication part.

15. The capacity control valve according to claim 1, wherein the auxiliary communication part has an opening area larger than a gap part between the shaft part of the valve body and the free end part of the pressure-sensitive body.

16. The capacity control valve according to claim 15, wherein the valve body includes plurality numbers of the auxiliary communication part.

17. The capacity control valve according to claim 1, wherein the valve body includes plurality numbers of the auxiliary communication part.

18. The capacity control valve according to claim 1, wherein the auxiliary communication part is made up of a gap part between the shaft part of the valve body and the free end part of the pressure-sensitive body.

* * * * *